(12) United States Patent
Boss et al.

(10) Patent No.: US 8,478,603 B2
(45) Date of Patent: Jul. 2, 2013

(54) METHOD AND SYSTEM FOR MONITORING AND REPORTING TO AN OPERATOR GREENHOUSE GAS EMISSION FROM A VEHICLE

(75) Inventors: Gregory Jensen Boss, Midland, MI (US); Rick Allen Hamilton, II, Richmond, VA (US); Jacquelyn Annette Martino, Hawthorne, NY (US); Clifford Alan Pickover, Yorktown Heights, NY (US); Anne R. Sanders, Colorado Springs, CO (US)

(73) Assignee: International Business Machines Corporation, Armonk, NY (US)

( * ) Notice: Subject to any disclaimer, the term of this patent is extended or adjusted under 35 U.S.C. 154(b) by 441 days.

(21) Appl. No.: 12/490,617

(22) Filed: Jun. 24, 2009

(65) Prior Publication Data
US 2010/0332241 A1 Dec. 30, 2010

(51) Int. Cl.
*G06Q 10/00* (2012.01)
(52) U.S. Cl.
USPC .......................................... 705/1.1; 73/35.15
(58) Field of Classification Search
USPC .......................................... 705/1.1; 73/35.15
See application file for complete search history.

(56) References Cited

U.S. PATENT DOCUMENTS

| | | | |
|---|---|---|---|
| 4,336,522 A | 6/1982 | Graham | |
| 5,086,389 A | 2/1992 | Hassett et al. | |
| 5,489,777 A | 2/1996 | Stedman et al. | |
| 5,532,690 A | 7/1996 | Hertel | |
| 5,583,765 A | 12/1996 | Kleehammer | |
| 5,694,322 A | 12/1997 | Westerlage et al. | |
| 5,717,389 A | 2/1998 | Mertens et al. | |
| 5,825,007 A | 10/1998 | Jesadanont | |
| 5,864,831 A | 1/1999 | Schuessler | |
| 5,892,463 A | 4/1999 | Hikita et al. | |
| 5,920,057 A | 7/1999 | Sonderegger et al. | |
| 6,018,699 A | 1/2000 | Baron, Sr. et al. | |
| 6,078,895 A | 6/2000 | Ryu et al. | |
| 6,104,299 A | 8/2000 | Brusseaux et al. | |

(Continued)

FOREIGN PATENT DOCUMENTS

| | | |
|---|---|---|
| AU | 2007100542 | 12/2007 |
| DE | 19634340 | 2/1998 |

(Continued)

OTHER PUBLICATIONS

Piguet et al.; Extremely Low-Power Logic; Proceedings of the Design, automation and Test in Europe Conference and Exhibition 2004 IEEE; 6 pages.

(Continued)

*Primary Examiner* — Heidi Riviere
(74) *Attorney, Agent, or Firm* — Schmeiser, Olsen & Watts; Anna Linne

(57) ABSTRACT

A method and system for monitoring greenhouse gas emission from a vehicle. The vehicle is monitored for greenhouse gas emission, which includes identifying a running total of greenhouse gas emitted by the vehicle into an external environment that is external to the vehicle and activating a payment triggering condition when the emission exceeds the expected total. Satisfaction of a payment triggering condition that triggers collection of a required payment pertaining to the identified running total of greenhouse gas emitted is detected. Responsive to detecting the satisfaction of the payment triggering condition the required payment is computed as a function of the stored running total of greenhouse gas emitted.

19 Claims, 3 Drawing Sheets

U.S. PATENT DOCUMENTS

| | | |
|---|---|---|
| 6,234,390 B1 | 5/2001 | Rabe |
| 6,356,838 B1 | 3/2002 | Paul |
| 6,405,132 B1 | 6/2002 | Breed |
| 6,411,889 B1 | 6/2002 | Mizunuma et al. |
| 6,525,673 B1 | 2/2003 | Feldman |
| 6,603,405 B2 | 8/2003 | Smith |
| 6,604,045 B2 | 8/2003 | Kuroda et al. |
| 6,693,555 B1 | 2/2004 | Colmenarez et al. |
| 6,696,981 B1 | 2/2004 | Hashimoto |
| 6,700,504 B1 | 3/2004 | Aslandogan et al. |
| 6,738,697 B2 | 5/2004 | Breed |
| 6,843,101 B2 | 1/2005 | Hok |
| 6,845,362 B2 | 1/2005 | Furuta et al. |
| 6,959,282 B2 | 10/2005 | Kakihara et al. |
| 7,003,398 B2 | 2/2006 | Seligmann |
| 7,053,792 B2 | 5/2006 | Aoki et al. |
| 7,127,413 B1 | 10/2006 | Yanagisawa et al. |
| 7,215,255 B2 | 5/2007 | Grush |
| 7,308,358 B2 | 12/2007 | Nozaki et al. |
| 7,320,430 B2 | 1/2008 | Dawson et al. |
| 7,343,341 B2 | 3/2008 | Sandor et al. |
| 7,375,648 B1 | 5/2008 | Mulka et al. |
| 7,385,525 B2 | 6/2008 | Ho et al. |
| 7,398,924 B2 | 7/2008 | Dawson et al. |
| 7,415,418 B2 | 8/2008 | Zimmerman |
| 7,426,489 B2 | 9/2008 | van Soestbergen et al. |
| 7,580,808 B2 * | 8/2009 | Bos .................. 702/127 |
| 7,908,149 B2 * | 3/2011 | Dar et al. ............ 705/1.1 |
| 7,966,221 B1 | 6/2011 | Givoly et al. |
| 7,969,325 B2 | 6/2011 | Hamilton, II et al. |
| 7,979,292 B2 | 7/2011 | Hamilton, II et al. |
| 8,055,534 B2 | 11/2011 | Ashby et al. |
| 2001/0037174 A1 | 11/2001 | Dickerson |
| 2002/0049630 A1 | 4/2002 | Furuta et al. |
| 2002/0065604 A1 | 5/2002 | Sekiyama |
| 2002/0072963 A1 | 6/2002 | Jonge |
| 2002/0084917 A1 | 7/2002 | Hauptman et al. |
| 2002/0103769 A1 | 8/2002 | Smith |
| 2002/0115410 A1 | 8/2002 | Higashino et al. |
| 2003/0037538 A1 | 2/2003 | Rendahl et al. |
| 2003/0040944 A1 | 2/2003 | Hileman |
| 2003/0065630 A1 | 4/2003 | Brown et al. |
| 2003/0110075 A1 | 6/2003 | Shioda et al. |
| 2003/0115095 A1 | 6/2003 | Yamauchi |
| 2003/0191568 A1 | 10/2003 | Breed |
| 2004/0039517 A1 | 2/2004 | Biesinger et al. |
| 2004/0049424 A1 | 3/2004 | Murray et al. |
| 2004/0075582 A1 | 4/2004 | Bergan et al. |
| 2004/0093264 A1 | 5/2004 | Shimizu |
| 2004/0119609 A1 | 6/2004 | Solomon |
| 2004/0167861 A1 | 8/2004 | Hedley |
| 2004/0212518 A1 | 10/2004 | Tajima et al. |
| 2005/0001739 A1 | 1/2005 | Sudou et al. |
| 2005/0003802 A1 | 1/2005 | Joseph |
| 2005/0024189 A1 | 2/2005 | Weber |
| 2005/0049781 A1 | 3/2005 | Oesterling |
| 2005/0168351 A1 | 8/2005 | Saze et al. |
| 2005/0179563 A1 | 8/2005 | Kelley |
| 2005/0187820 A1 | 8/2005 | Mohan |
| 2005/0246190 A1 | 11/2005 | Sandor et al. |
| 2005/0256762 A1 | 11/2005 | Dar et al. |
| 2005/0278214 A1 | 12/2005 | Takida |
| 2006/0015394 A1 | 1/2006 | Sorensen |
| 2006/0136291 A1 | 6/2006 | Morita et al. |
| 2006/0155486 A1 | 7/2006 | Walsh et al. |
| 2006/0173579 A1 | 8/2006 | Desrochers et al. |
| 2006/0255967 A1 | 11/2006 | Woo et al. |
| 2006/0278705 A1 | 12/2006 | Hedley et al. |
| 2007/0061057 A1 | 3/2007 | Huang et al. |
| 2007/0063858 A1 | 3/2007 | Lee et al. |
| 2007/0083322 A1 | 4/2007 | Van Ee |
| 2007/0100687 A1 | 5/2007 | Yoshikawa |
| 2007/0106465 A1 | 5/2007 | Adam et al. |
| 2007/0131864 A1 | 6/2007 | Ellis et al. |
| 2007/0135990 A1 | 6/2007 | Seymour et al. |
| 2007/0203642 A1 | 8/2007 | Arnold-Huyser |
| 2007/0260393 A1 | 11/2007 | Abernethy et al. |
| 2007/0268140 A1 | 11/2007 | Tang et al. |
| 2007/0271034 A1 | 11/2007 | Perry |
| 2007/0271035 A1 | 11/2007 | Stoschek et al. |
| 2007/0278300 A1 | 12/2007 | Dawson et al. |
| 2007/0299607 A1 | 12/2007 | Cubillo |
| 2008/0021723 A1 | 1/2008 | Devarakonda |
| 2008/0033644 A1 | 2/2008 | Bannon |
| 2008/0091341 A1 | 4/2008 | Panabaker et al. |
| 2008/0120024 A1 | 5/2008 | Obradovich et al. |
| 2008/0129548 A1 | 6/2008 | Firestone |
| 2008/0140318 A1 | 6/2008 | Breed |
| 2008/0148816 A1 | 6/2008 | Groves |
| 2008/0161989 A1 | 7/2008 | Breed |
| 2008/0175438 A1 | 7/2008 | Alves |
| 2008/0195428 A1 | 8/2008 | O'Sullivan |
| 2008/0208680 A1 | 8/2008 | Cho |
| 2008/0221948 A1 | 9/2008 | Eglen et al. |
| 2008/0236141 A1 | 10/2008 | Peng et al. |
| 2009/0018902 A1 | 1/2009 | Miller et al. |
| 2009/0210261 A1 | 8/2009 | Mortimore |
| 2009/0222338 A1 | 9/2009 | Hamilton et al. |
| 2009/0287408 A1 | 11/2009 | Gerdes et al. |
| 2009/0295599 A1 | 12/2009 | Coffee et al. |
| 2010/0070128 A1 | 3/2010 | Johnson |
| 2010/0085213 A1 | 4/2010 | Turnock et al. |
| 2010/0106567 A1 | 4/2010 | McNew et al. |
| 2010/0153125 A1 | 6/2010 | Hamilton, II et al. |
| 2010/0153191 A1 | 6/2010 | Hamilton, II et al. |
| 2010/0153192 A1 | 6/2010 | Hamilton, II et al. |
| 2010/0153193 A1 | 6/2010 | Ashby et al. |
| 2010/0156670 A1 | 6/2010 | Hamilton, II et al. |
| 2010/0161391 A1 | 6/2010 | Ashby et al. |
| 2010/0161392 A1 | 6/2010 | Ashby et al. |
| 2010/0201505 A1 | 8/2010 | Honary et al. |
| 2010/0268449 A1 | 10/2010 | Feng |
| 2011/0071721 A1 * | 3/2011 | Gilfillan et al. .................. 701/30 |
| 2011/0082797 A1 | 4/2011 | Glachant et al. |
| 2011/0087430 A1 | 4/2011 | Boss et al. |
| 2011/0087524 A1 | 4/2011 | Boss et al. |
| 2011/0087525 A1 | 4/2011 | Boss et al. |
| 2011/0166958 A1 | 7/2011 | Hamilton, II et al. |

FOREIGN PATENT DOCUMENTS

| | | |
|---|---|---|
| EP | 1519288 | 3/2006 |
| JP | 2000172892 | 6/2000 |
| JP | 2001101561 | 4/2001 |
| JP | 2001283377 | 10/2001 |
| JP | 2002032893 | 1/2002 |
| JP | 2004157842 | 6/2004 |
| WO | 02071366 | 9/2002 |
| WO | 2009065638 | 5/2009 |

OTHER PUBLICATIONS

Xu et al.; A Serializability Violation Detector for Shared-Memory Server Programs; PLDI'05, Jun. 12-15, 2005, Chicago, Illinois, USA; 14 pages.

Holmes, Tiffany; Eco-visualization: Combining Art and Technology to Reduce Energy Consumption; C&C'07, Jun. 13-15, 2007, Washington, DC, USA; pp. 153-162.

Carr, Brian; Fuel Economy Tip-Tailgating Doesn't Help; Daily Fuel Economy Tip; May 27, 2006; [retrieved on Jan. 5, 2012]. Retrieved from the Internet: <URL: http://www.dailyfueleconomytip.com/driving-habits/fuel-economy-tip-tailgating-doesnt-help/>; 6 pages.

Mao et al.; Route Flap Damping Exacerbates Internet Routing Convergence; SIGCOMM'02, Aug. 19-23, 2002, Pittsburgh, PA, USA; pp. 221-233.

Lindgaard, Gitte. Making the Business Our Business: One Path to Value-Added HCI, Human Oriented Technology Lab, Carleton University, Ottawa, Ontario, Canada; Interactions May and Jun. 2004, pp. 13-17.

Tomaz et al.; TRA; Modeling the spatial parameters for dynamic road pricing: Transport Research Arena Europe 2008; Ljubljana; 7 pages.

Aman et al.; Evaluation of Congestion Pricing for Management Highway in Seattle; 6 pages.

Electronic Tolling/Congestion Pricing; U.S. Department of Transportation Federal Highway Administration; 4 pages.

Mobile Prompts for Detours Help Reduce Commute Time for Drivers [online]; AT&T News Release; San Antonio, Texas, Jun. 7, 2007, [retrieved on Feb. 28, 2012]. Retrieved from the Internet <URL: http://www.att.com/gen/press-room?pid=4800&cdvn=news&newsarticleid=23918>; 2 pages.

Whoriskey, Peter; Beating Traffic by Joining the Network [online]; [retrieved on Feb. 28, 2012]. Retrieved from the Internet <URL: http://www.washingtonpost.com/wp-dyn/content/story/2008/03/24/ST2008032403495.html>; 2 pages.

Get out of the jam: Avoid traffic with TeleNav GPS Navigator [online]; [retrieved on Feb. 28, 2012]. Retrieved from the Internet <URL: http://www.telenav.com/products/tn/traffic.html>; 2 pages.

Capturing traffic data using GPS-enabled cell phones Machines Like Us Biog [online]; originally posted Feb. 10, 2008 [retrieved on Feb. 28. 2012]. Retrieved from the Internet <URL: http://web.archive.org/web/20081013102040/http://www.machineslikeus.com/cms/capturing-traffic-data-using-GPS-enable-cell-phones.html>; 6 pages.

Method for Dynamic Road Status Information Conveyance Under Inclement Conditions; IBM; IP.com Technical Disclosure; IPCOM000177535D; Dec. 17, 2008; 5 pages.

Vehicle Route Planning Based on Real-Time Pollution Monitoring; IBM; IP.com Technical Disclosure: IPCOM000175555D; Oct. 13, 2008, 3 pages.

Dynamic Routing Based on Restricted Area and Policies; IBM; IP.com Technical Disclosure; IPCOM000177536D; Dec. 17, 2008; 5 pages.

Techno junkies meet plow truck operators for safety, security and keeping the honest man, you know, honest; Snowplow News [online]; [retrieved on Feb. 29, 2012]. Retrieved from the Internet <URL: http://web.archive.org/web/20081226183017/http://www.snowplownews.com/location-commun.html>; 2 pages.

Super-powerful traffic and travel info; Virginia Department of Transportation; 2010 [online]; [retrieved on Feb. 29, 2012]. Retrieved from the Internet <URL: http://www.511virginia.org/Default.aspx?r=1>; 1 page.

Method for Construction-Induced Pollution Amelioration via Carbon Offset; IBM; IP.com Technical Disclosure IPCOM000183626D; May 29, 2009; 7 pages.

IBM launches 'green' consulting services [online]; iNSnet Foundation Sep. 29, 2008; [retrieved on Feb. 29, 2012]. Retrieved from the Internet <URL: http://web.archive.org/web/20081002035154/http://www.insnet.org/ins_headlines.rsml?id=23782&photo=&title=IBM%20launches%20%green%27%20consulting%services>; 3 pages.

Regan, Keith; Blue Pushes Green With Carbon Offset Modeler [online]; E-Commerce Times (Part of the ECT News Network) originally posted May 22, 2008; [retrieved on Feb. 29, 2012]. Retrieved from the Internet <URL:http://www.crmbuyer.com/story/63124.html>; 3 pages.

Carbon offset [online]; Wikipeida; [retrieved on Feb. 29, 2012]. Retrieved from the Internet <URL: http://en.wikipedia.org/wiki/Carbon_offset>; 16 pages.

Komanoff Charles: Auto Fee NYC: A Roadway Pricing Primer Transportation Alternatives Jul./Aug. 1994 Issue, 4 pages.

Komanoff, Charles; Environmental Consequences of Road Pricing; A Scoping Paper for The Energy Foundation; Apr. 1997; 24 pages.

Peak-time Driving Tolls Limit Pollution, Traffic [online]; AzCentral.com; [retrieved on Aug. 14, 2008] Retrieved from the Internet <URL: http://www.azcentral.com/arizonarepublic/local/articles/2008/08/08/20080809earthtalk080>; 1 page.

Florida's Turnpike Offers Important Hurricane Evacuation Tips, Florida's Turnpike Enterprise Press Release, Jun. 1, 2006; 2 pages.

State Toll Exemption Policy [online]; [retrieved on Nov. 8, 2010]. Retrieved from the Internet <URL: https://www.txdot.gob/cgi-bin/pfpage.plx>, Texas Department of Transportation; 1 page.

Bob Poole in WSJ on getting rid of Toll Plazas [online]; TollRoadNews; Nov. 6, 2007 [retrieved on Nov. 1, 2010]. Retrieved from the Internet <URL: http//www.tollroadnews.com/node/3232>; 8 pages.

Priewasser, Reinhold; Ecological sustainability and personal behavior relations demonstrated by the decision-making process of selecting a certain transportation mean; Environmental Management and Health, vol. 10 Issue 3; 1999; 8 pages.

Bjerde et al.; High Level Group on Transport Infrastructure Charging Final Report on Options for Charging Users Directly for Transport Infrastructure Operating Costs; Sep. 9, 1999; 27 pages.

Real-Time Ridesharing Launches on SR 520 to Save Commuters Time, Money; Business Wire; Jan. 27, 2011; 3 pages.

Yglesias, Matt; I-95 Express Lane Pricing; Apr. 23, 20011; URL http://counterpolicies.com/tag/toll-roads; retrieved from the Internet Jan. 12, 2012; 4 pages.

Notice of Allowance (Mail Date Jan. 17, 2012) for U.S. Appl. No. 12/578,663, filed Oct. 14, 2009.

Request for Continued Examination filed Apr. 5, 2012 for U.S. Appl. No. 12/490,617, filed Jun. 24, 2009.

Office Action (Mail Date Nov. 16, 2011) for U.S. Appl. No. 12/652,127, filed Jan. 5, 2010.

Amendment filed Mar. 15, 2012 in response to Office Action (Mail Date Nov. 16, 2011) for U.S. Appl. No. 12/652,127, filed Jan. 5, 2010.

Office Action (Mail Date Aug. 2, 2010) for U.S. Appl. No 12/341,009, filed Dec. 22, 2008.

Amendment filed Oct. 29, 2010 in response to Office Action (Mail Date Aug. 2, 2010) for U.S. Appl. No. 12/341,009, filed Dec. 22, 2008.

Final Office Action (Mail Date Nov. 12, 2010) for U.S. Appl. No. 12/341,009, filed Dec. 22, 2008.

Notice of Abandonment (Mail Date Jun. 10, 2011) for U.S. Appl. No. 12/341,009, filed Dec. 22, 2008.

Office Action (Mail Date Jul. 30, 2010) for U.S. Appl. No. 12/336,820, filed Dec. 17, 2008.

Amendment filed Oct. 29, 2010 in response to Office Action (Mail Date Jul. 30, 2010) for U.S. Appl. No. 12/336,820, filed Dec. 17, 2008.

Final Office Action (Mail Date Nov. 26, 2010) for U.S. Appl. No. 12/336,820, filed Dec. 17, 2008.

Notice of Abandonment (Mail Date Jun. 21, 2011) for U.S. Appl. No. 12/336,820; filed Dec. 17, 2008.

Office Action (Mail Date Oct. 29, 2010) for U.S. Appl. No. 12/336,587, filed Dec. 17, 2008.

Amendment filed Jan. 28, 2011 in response to Office Action (Mail Date Oct. 29, 2010) for U.S. Appl. No. 12/336,587, filed Dec. 17, 2008.

Final Office Action (Mail Date Apr. 8, 2011) for U.S. Appl. No. 12/336,587, filed Dec. 17, 2008.

Notice of Appeal filed Jul. 6, 2011 in response to Final Office Action (Mail Date Apr. 8, 2011) for U.S. Appl. No. 12/336,587, filed Dec. 17, 2008.

Appeal Brief filed Sep. 2, 2011 for U.S. Appl. No. 12/336,587, filed Dec. 17, 2008.

Office Action (Mail Date Apr. 3, 2012) for U.S. Appl. No. 12/652,127, filed Jan. 5, 2010.

Examiner's Answer (Mail Date Nov. 25, 2011) to Appeal Brief filed Sep. 2, 2011 for U.S. Appl. No. 12/336,587, filed Dec. 17, 2008.

Reply Brief filed Jan. 24, 2012 in response to Examiner's Answer (Mail Date Nov. 25, 2011) to Appeal Brief filed Sep. 2, 2011 for U.S. Appl. No. 12/336,587, filed Dec. 17, 2008.

Notice of Allowance (Mail Date Feb. 22, 2011) for U.S. Appl. No. 12/341,054, filed Dec. 22, 2008.

Notice of Allowance (Mail Date Mar. 7, 2011) for U.S. Appl. No. 12/336,742, filed Dec. 17, 2008.

Office Action (Mail Date Aug. 19, 2010) for U.S. Appl. No. 12/341,087, filed Dec. 22, 2008.

Amendment filed Nov. 19, 2010 in response to Office Action (Mail Date Aug. 19, 2010) for U.S. Appl. No. 12/341,087, filed Dec. 22, 2008.

Notice of non-compliant or non-responsive amendment (Mail Date Nov. 29, 2010) for U.S. Appl. No. 12/341,087, filed Dec. 22, 2008.

Amendment filed Dec. 27, 2010 in response to Notice of non-compliant or non-responsive amendment (Mail Date Nov. 29, 2010) for U.S. Appl. No. 12/341,087, filed Dec. 22, 2008.

Notice of non-compliant or non-responsive amendment (Mail Date Jan. 10, 2011) for U.S. Appl. No. 12/341,087, filed Dec. 22, 2008.

Amendment filed Jan. 31, 2011 in response to Notice of non-compliant or non-responsive amendment (Mail Date Jan. 10, 2011) for U.S. Appl. No. 12/341,087, filed Dec. 22, 2008.
Final Office Action ( Mail Date Apr. 13, 2011) for U.S. Appl. No. 12/341,087, filed Dec. 22, 2008.
Amendment filed Jun. 8, 2011 in response to Final Office Action (Mail Date Apr. 13, 2011) for U.S. Appl. No. 12/341,087, filed Dec. 22, 2008.
Notice of Allowance (Mail Date Jun. 29, 2011) for U.S. Appl. No. 12/341,087, filed Dec. 22, 2008.
Office Action (Mail Date Sep. 30, 2011) for U.S. Appl. No. 12/336,754, filed Dec. 17, 2008.
Amendment filed Dec. 22, 2011 in response to Office Action (Mail Date Sep. 30, 2011) for U.S. Appl. No. 12/336,754, filed Dec. 17, 2008.
Notice of Allowance (Mail Date Jan. 24, 2012) for U.S. Appl. No. 12/336,754, filed Dec. 17, 2008.
Office Action (Mail Date Apr. 30, 2012) for U.S. Appl. No. 12/578,627, filed Oct. 14, 2009.
Final Office Action (Mail Date Oct. 10, 2012) for U.S. Appl. No. 12/578,627; Filing Date Oct. 14, 2009; Art Unit 3622, Confirmation No. 6714.

* cited by examiner

METHOD AND SYSTEM FOR MONITORING AND REPORTING TO AN OPERATOR GREENHOUSE GAS EMISSION FROM A VEHICLE

BACKGROUND OF THE INVENTION

The present invention relates generally to anthropogenic greenhouse gases, and more particularly to monitoring and reporting to an operator anthropogenic greenhouse gas emission.

Conventionally, calculating anthropogenic greenhouse gas emission with respect to a vehicle relies primarily on operator input in the form of miles/kilometers per gallon (MPG/KPG) and distance traveled. The conventional method does not take into account operating habits and at best calculates only an estimated greenhouse gas emission.

Additionally, should an operator wish to offset a vehicle's greenhouse gas emission, the operator must actively seek out ways to do such using only the estimated greenhouse gas emission value. Moreover, the conventional method only identifies the estimated greenhouse gas emission and remains silent on how an operator may reduce greenhouse gas emissions.

SUMMARY OF THE INVENTION

The present invention provides a method for monitoring greenhouse gas emission from a vehicle, said method comprising:

monitoring the vehicle for greenhouse gas emission, said monitoring comprising identifying a running total of greenhouse gas emitted by the vehicle into an external environment that is external to the vehicle;

detecting satisfaction of a payment triggering condition that triggers collection of a required payment pertaining to the stored running total of greenhouse gas emitted;

responsive to said detecting satisfaction of the payment triggering condition, computing the required payment as a function of the stored running total of greenhouse gas emitted; and a processor of a computer system providing notice of the required payment to a party selected from the group consisting of an operator of the vehicle, an owner of the vehicle, a collecting party authorized to collect the required payment, a responsible party responsible for submitting the required payment to the collecting party, and combinations thereof.

The present invention provides a process for supporting computer infrastructure, said process comprising providing at least one support service for at least one of creating, integrating, hosting, maintaining, and deploying computer-readable code in a computing system, wherein the code in combination with the computing system is configured to perform a method for monitoring greenhouse gas emission from a vehicle, said method comprising:

monitoring the vehicle for greenhouse gas emission, said monitoring comprising identifying a running total of greenhouse gas emitted by the vehicle into an external environment that is external to the vehicle;

detecting satisfaction of a payment triggering condition that triggers collection of a required payment pertaining to the identified running total of greenhouse gas emitted;

responsive to said detecting satisfaction of the payment triggering condition, computing the required payment as a function of the stored running total of greenhouse gas emitted; and a processor of a computer system providing notice of the required payment to a party selected from the group consisting of an operator of the vehicle, an owner of the vehicle, a collecting party authorized to collect the required payment, a responsible party responsible for submitting the required payment to the collecting party, and combinations thereof.

DETAILED DESCRIPTION OF THE INVENTION

Although certain embodiments of the present invention are described herein, it is understood that modifications may be made to the present invention without departing from its course and scope. Scope of the present invention is not limited to the number of constituting components, the materials thereof, the shapes thereof, the relative arrangement thereof, etc. Furthermore, while the accompanying drawings illustrate certain embodiments of the present invention, such drawings are not necessarily depicted to scale.

Figure 1:
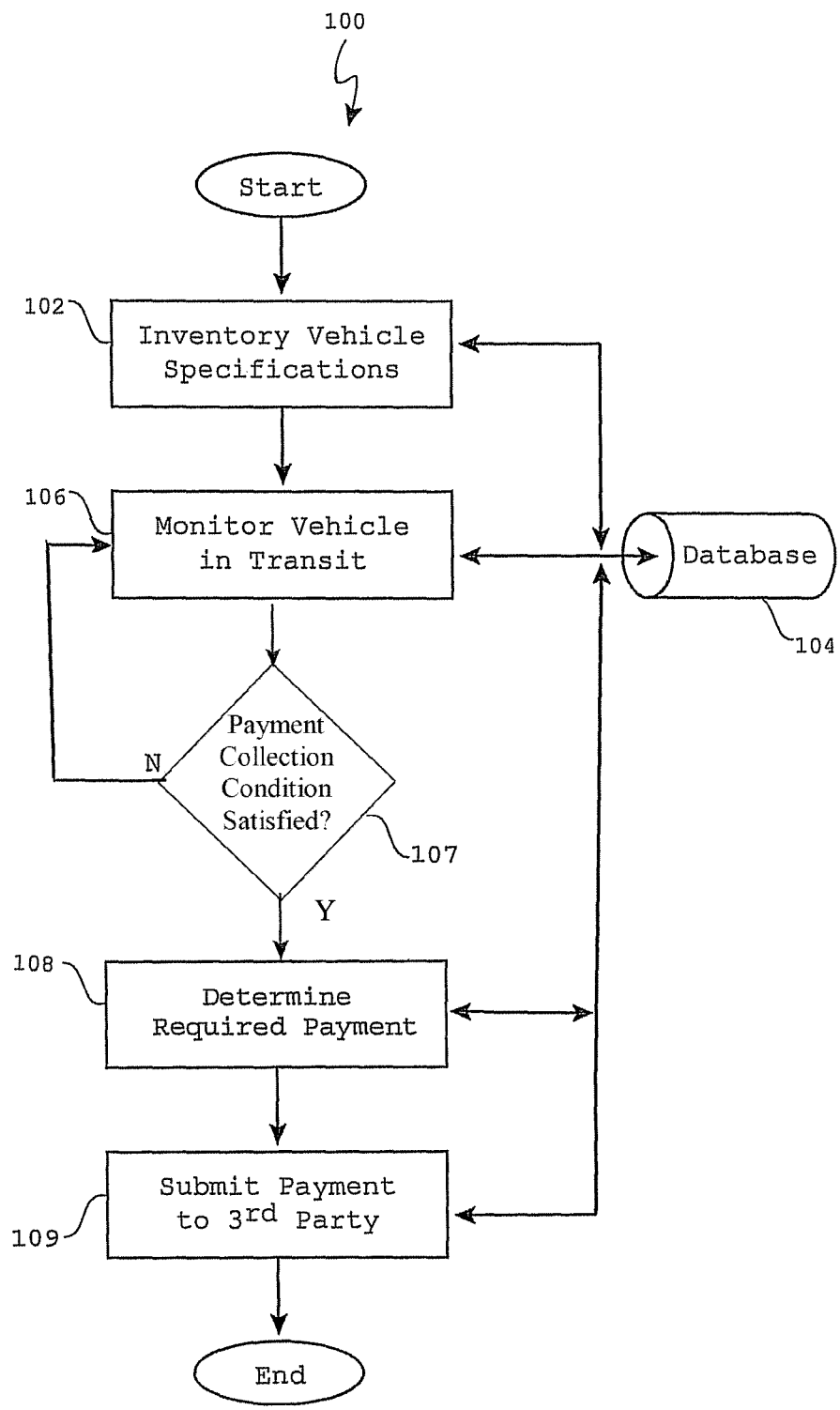
FIG. 1 illustrates a method for monitoring and reporting to an operator anthropogenic greenhouse gas emission, in accordance with embodiments of the present invention.

FIG. 1 illustrates a method 100 for monitoring and reporting to an operator anthropogenic greenhouse gas emission from a vehicle, in accordance with embodiments of the present invention. The method 100 begins with step 102 which comprises inventorying a vehicle's specifications. The type and amount of gaseous species contained within the anthropogenic greenhouse gas emission is a function of the particular type of fuel being used to energize the vehicle as well as equipment in the vehicle that processes greenhouse gas products resulting from consumption of the fuel by the vehicle. Said gaseous species may include carbon dioxide, water vapor, etc. In one embodiment, carbon dioxide is the only greenhouse gaseous species monitored. In one embodiment, carbon dioxide and other specified greenhouse gas products resulting from the fuel consumption are monitored.

In one embodiment of the present invention, inventorying a vehicle's specifications comprises identifying, inter alia, the vehicle's unladened (i.e., without added content such as passengers, cargo, etc.) gross weight, fuel tank capacity, recommended fuel octane or cetane rating, proper compression ratio in the vehicle's engine cylinders, the number of cylinders present in the vehicle's engine, oil tank capacity, proper air flow capacity through the vehicle's intake, etc.

The inventoried information is then stored in a database 104. The database 104 stored in is a computer readable storage medium of the computer system 900 described infra in conjunction with FIG. 3. The computer system 900 may be disposed in the vehicle. In one embodiment of the present invention, the database 104 resides within the vehicle being inventoried. In another embodiment of the present invention, the database 104 resides in a location outside of the vehicle being inventoried, but communication between said database 104 and said vehicle is achieved by means of a wireless connection.

The specifications inventoried pursuant to step 102 will be used in connection with an operator's characteristics gathered in step 106, infra, to determine the amount of anthropogenic greenhouse gas emission the monitored vehicle emits into the atmosphere. Additionally, the specifications inventoried pursuant to step 102 may be utilized by the method 100 to identify steps an operator can tale to minimize anthropogenic greenhouse gas emission. After completion of step 102, the method 100 continues with step 106 which comprises monitoring the vehicle in transit (i.e., in motion).

In one embodiment of the present invention, step 106 monitors the exhaust gases emitted from the vehicle in transit and identifies the presence and quantity of anthropogenic greenhouse gases contained therein. The monitoring may be performed by means of utilizing at least one greenhouse gas sensor located within the exhaust system of the vehicle. In one embodiment, the monitoring may be selective to different gas species that are specified for being monitored. For example, the greenhouse gas species monitored may include carbon dioxide but not include water vapor. Alternatively, the greenhouse gas species monitored may include both carbon dioxide and water vapor. In another alternative, the gas species monitored may include water vapor oxide but not include carbon dioxide. In one embodiment, the total quantity of all emitted greenhouse gases is monitored.

A numeric value of a running total representing the quantity of anthropogenic greenhouse gas emission released by the vehicle, into an external environment that is external to the vehicle, is stored in the database 104 as the gas emission is being monitored (selectively or in total) in step 106. This numeric value may be the quantity of anthropogenic greenhouse gas emitted since the vehicle's engine was last started during the current use. Thus, the numeric value represents the quantity of anthropogenic greenhouse gas emitted during the current use of the vehicle being monitored since the vehicle's engine was started during the current use.

The database 104 may comprise a numerical value representing a measure of a 'running total' of anthropogenic greenhouse gas emissions (as measured by the volume or weight or other pertinent measure of the anthropogenic greenhouse gas emissions) from the monitored vehicle since the last payment to a collecting entity was paid in step 109, infra. If payment to a collecting entity has yet to be made, the 'running total' value represents all anthropogenic greenhouse gas emissions by the monitored vehicle since monitoring began in step 106.

In one embodiment of the present invention, the database 104 may comprise additional values which may be useful to the operator of the monitored vehicle in minimizing the emission of anthropogenic greenhouse gases. Such additional values may include, inter alia, an overall total quantity of anthropogenic greenhouse gas emitted by the monitored vehicle since: the vehicle's last purchase; a measure of a total quantity of anthropogenic greenhouse gas emissions from the monitored vehicle (as measured by the volume or weight or other pertinent measure of the anthropogenic greenhouse gas emissions) over a specified period of previous time (e.g., in the past one month, six months, one year, etc.); a quantity of green house gas emitted by the vehicle since an engine of the vehicle was last started; a quantity of green house gas emitted by the vehicle since a payment triggering condition was previously detected in step 107 (discussed infra) before the current monitoring in step 106 was initiated.

In another embodiment of the present invention, monitoring the vehicle in transit includes identifying at least one way in which the operator may change operating habits and/or vehicle features to improve fuel efficiency to decrease anthropogenic greenhouse gas emission. See the discussion of FIG. 2, infra, for a detailed description of this embodiment of the present invention.

Step 107 tests for satisfaction of a payment triggering condition that triggers collection of a required payment pertaining to the stored running total. Completion of step 106 may result from detecting, in step 107, satisfaction of the payment triggering condition; e.g., when the monitored vehicle arrives at a location which contains a payment system to facilitate submission of a payment in step 109, infra. For example, the location may be a fuel station equipped with a payment system to facilitate the transmission of a payment for anthropogenic greenhouse gas emissions. When the monitored vehicle enters the fuel station, detection of said payment system (e.g., by a detection sensor in the vehicle after the vehicle has entered the fuel station) may be the payment triggering condition of step 107 that results in completion of step 106.

Alternatively, detection of satisfaction of the payment triggering condition in step 107 may comprise detection of a parameter having a value in relation to (e.g., exceeding) a specified threshold. The parameter may be, inter alia, a time elapsed since the last payment to a collecting entity (resulting in completion of step 106 if this parameter exceeds a specified time elapsed threshold); a measure of anthropogenic greenhouse gas emitted by the monitored vehicle (resulting in completion of step 106 if this parameter exceeds a specified gas emission measure threshold); a monetary removal cost of removing the 'running total' of a quantity of anthropogenic greenhouse gas from the atmosphere (resulting in completion of step 106 if this parameter exceeds a specified monetary removal cost threshold), etc.

If satisfaction of the payment triggering condition is not detected in step 107, then the method 100 loops back to step 106 to continue to monitor the anthropogenic greenhouse gas emissions from the vehicle in transit, followed by execution of step 107 to test for satisfaction of the payment triggering condition.

In response to detection of satisfaction of the payment triggering condition in step 107, the method 100 continues with step 108 which comprises determining a required payment due to a collecting entity as a result of the monitoring performed in step 106. The amount of the required payment determined in step 108 is a function of (i.e., based on) the measure of the 'running total' of anthropogenic greenhouse gas emissions and may reflect a monetary removal cost (i.e., cost of removing from the atmosphere the 'running total' of the emitted anthropogenic greenhouse gas). The monetary removal cost may be a function of the 'running total' of anthropogenic greenhouse gas emissions stored in the database 104 as well as the distribution of the various gaseous species being monitored.

The amount of the required payment on step 108 may also include profit to an entity responsible for removing the 'running total' quantity of anthropogenic greenhouse gas from the atmosphere and/or tax collected by one or more governmental entities (e.g., the federal government, a state government, a local government, etc.). The tax may be a function of at least one of: the measure of the 'running total' quantity of anthropogenic greenhouse gas emission from the vehicle; the monetary removal cost; etc.

The required payment determined in step 108 may be stored in the database 104.

In one embodiment of the present invention, a payment is submitted to a "collecting entity" in step 109 in response to the payment due that was determined in step 108. The collecting entity may be an individual or an organization (e.g., business organization, governmental organization, labor union, social organization, charitable organization, etc.) or a database stored in a computer readable medium, a data processing system such as a computer or computer system, etc, owned or controlled by said individual or organization. The responsible party for submitting the payment to the collecting party in step 109 may be the owner of the vehicle. The responsible party for submitting the payment may be notified of the payment in any manner known in the art for notifying a party that a payment is due from the party. In one embodiment, the collecting entity is notified by the computer system 900 (see FIG. 3, described infra) of the payment due that was determined in step 108, which results in the collecting entity notifying the responsible party of the payment that is due (e.g., by sending a bill to the responsible party). In another embodiment, the computer system 900 alerts the operator or owner of the vehicle that the payment is due (e.g., by flashing a visual message on the dashboard of the vehicle or pay vocalizing a message using speakers in the vehicle).

In another embodiment of the present invention, the payment submitted in step 109 may provide for the removal of a percentage of the 'running total' quantity of anthropogenic greenhouse gas from the vehicle or from the atmosphere. This embodiment would allow for the situation where an operator of the vehicle pays for the emission of or removal of less and/or more than the operator's contribution of anthropogenic greenhouse gas released into the atmosphere.

The operator may select the collecting entity to whom payment is made prior to initiation of the method 100; prior to the first iteration of step 109; or at each iteration of step 109. A list of collecting entities specializing in anthropogenic greenhouse gas removal may be presented to the operator.

In another embodiment of the present invention, the operator may select a collecting entity which is not identified on a list provided to said operator. In another embodiment of the present invention, the operator may supply a collecting entity in lieu of receiving a list of entities specializing in anthropogenic greenhouse gas removal. In yet another embodiment of the present invention, the payment may be submitted to a collecting entity which itself does not specialize in anthropogenic greenhouse gas removal, but facilitates the receipt and disbursement of funds to remove anthropogenic greenhouse gas from the atmosphere.

In order to reduce the need for operator interaction, submission of the payment to the collecting entity may be made by means of a wireless electronic funds transaction (EFT). Other forms of payment submission may also be utilized by step 109, for example including the payment value in the next purchase made by the operator at a point of sale (POS) location.

Generally, notice of the required payment is provided to a party selected from the group consisting of an operator of the vehicle, an owner of the vehicle, a collecting party authorized to collect the required payment, a responsible party responsible for submitting the required payment to the collecting party, and combinations thereof. In one embodiment, said notice of the required payment is so provided by a processor of a computer system (e.g., the computer system 104 or anther computer system).

After the payment is successfully submitted to the collecting entity, step 109 resets the 'running total' value (or measure thereof) stored in the database 104 to zero (0.00) and the method 100 ends.

Figure 2:
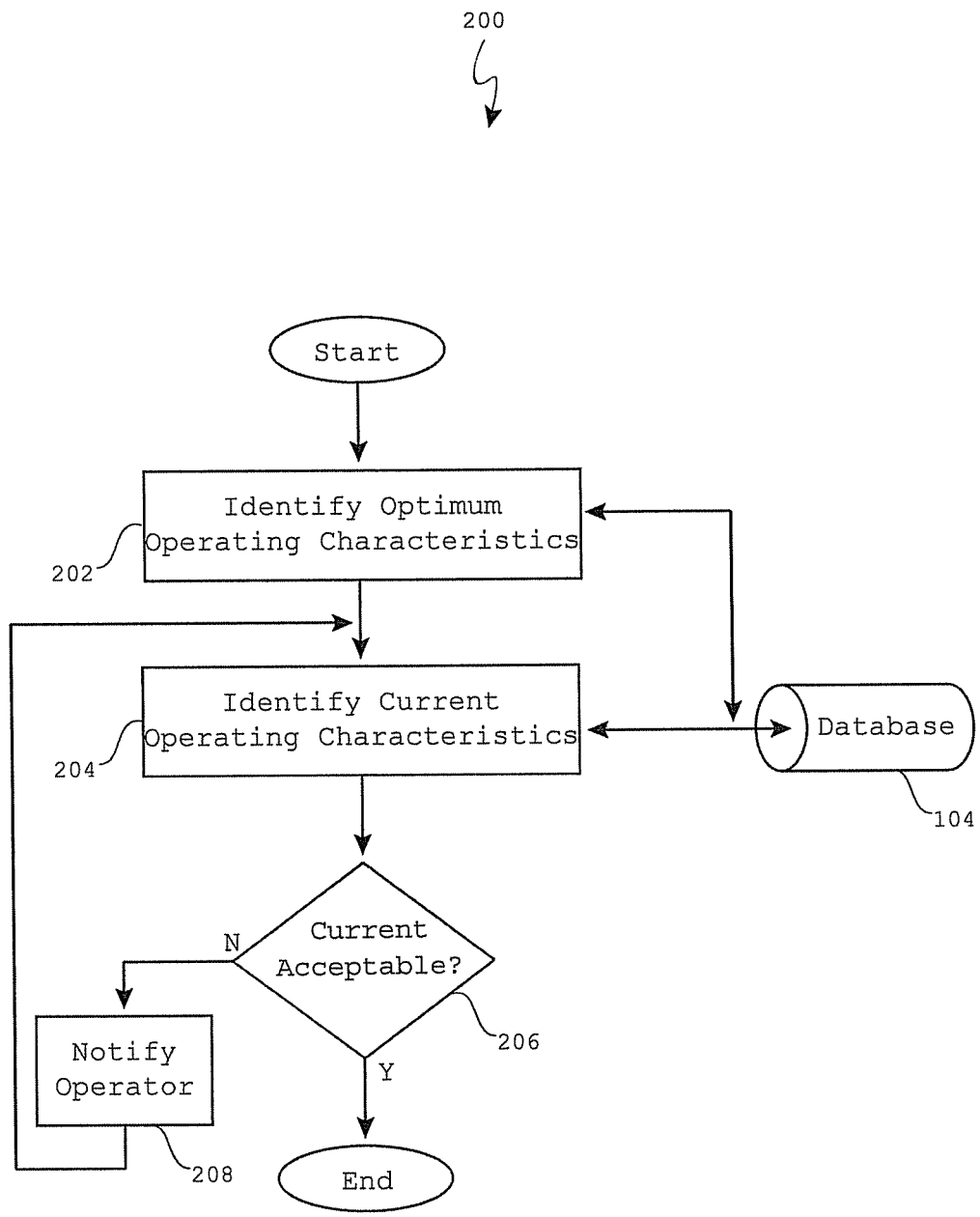
FIG. 2 illustrates a method for notifying an operator of a vehicle when said vehicle is emitting excessive greenhouse gases, in accordance with embodiments of the present invention.

FIG. 2 illustrates a method 200 for notifying an operator of a vehicle when said vehicle is emitting excessive greenhouse gases, in accordance with embodiments of the present invention. The method 200 begins with step 202 which comprises identifying optimum operating characteristics.

Optimum operating characteristics comprises vehicle specifications which in concert provide the maximum attainable fuel efficiency for the vehicle. The less fuel consumed correlates to a greater distance achieved per tank of fuel, which correlates to better fuel efficiency, which results in less anthropogenic greenhouse gases being released into the atmosphere to travel the same distance. The optimum operating characteristics may be obtained from, inter alia, the vehicle manufacturer, statistical data stored in the database 104, statistical data available on the Internet, a third party provider, etc.

For example, every vehicle has an unladened gross weight, which by its very nature is the lightest weight a given vehicle can attain. Therefore, operating a vehicle weighing close to its unladened gross weight would be preferred over operating a vehicle weight upwards of six hundred pounds (600.00 lbs) in excess of the vehicle's unladened gross weight.

Similarly, a vehicle has a unique optimum speed at which the vehicle operates at a minimum fuel consumption rate defined as the least amount of fuel consumed per distance (e.g., mile, km, etc.) traveled. For example, a given vehicle may utilize less fuel per distance traveled at a constant seventy miles per hour (70.00 mph/112.65 kph) than the vehicle utilizes at a constant eighty five miles per hour (85.00 mph/136.97 kph). Assuming the vehicle's weight remains constant, then seventy miles per hour (70.00 mph/112.65 kph) is closer to the unique optimum speed than is eight five miles per hour (85.00 mph/136.97 kph).

Step 202 identifies the unique optimum speed of the vehicle being monitored and stores this information along with all other optimum operating characteristics in the database 104. Some of the optimum characteristics will be retrieved from the inventoried vehicle specification pursuant to step 102 of method 100 (see FIG. 1, supra). For example, the unladened gross weight of a vehicle can be retrieved from the inventoried specifications gathered supra rather than identifying such a weight each and every time step 202 is invoked.

In one embodiment of the present invention, step 202 is performed once and the results are stored in the database 104 for future reference and/or invocation of method 200. In an alternative embodiment of the present invention, step 202 is performed during each invocation of method 200.

After identifying each optimum characteristic which in concert provide the maximum attainable fuel efficiency for the vehicle and storing such results in the database 104, step 202 is complete and the method 200 continues with step 204 which comprises identifying the current operating characteristics.

Step 204 identifies the vehicle's fuel efficiency ratio defined as distance traveled per volumetric amount of fuel consumed (e.g., miles/gallon or kilometers/liter). The fuel efficiency ratio is stored in the database 104. Next, additional operating characteristics are measured and/or identified. In one embodiment of the present invention, the additional operating characteristics are the same characteristics inventoried in step 102 of method 100 (see FIG. 1, supra). In an alternative embodiment of the present invention, the additional operating characteristics are the same characteristics identified in 202. Regardless of the embodiment, the additional characteristics are stored in the database 104. After step 204 concludes, the method 200 continues with step 206 which comprises determining whether the current characteristics are acceptable in consideration of the optimum characteristics.

In one embodiment of the present invention, step 206 compares the vehicle's fuel efficiency ratio to an optimum fuel efficiency ratio which is the inverse of the minimum fuel consumption rate defined supra. If the current fuel efficiency ratio is not less than a specified percent (e.g., 70%, 75%, 80%, 85%, 90%, 95%, 99%, 100%, etc.) of the optimum fuel efficiency ratio, then step 206 returns a response 'yes', followed by step 206 which concludes the method 200.

However, if the current fuel efficiency ratio is less than the specified percent of the optimum fuel efficiency ratio, then step 206 returns a response 'no' and the method 200 continues with step 208 which comprises notifying the operator of the vehicle of ways in which to improve fuel efficiency.

In an alternative embodiment of the present invention, if the current fuel efficiency ratio is not less than a specified number of standard deviations (e.g., one standard deviation, 0.5 standard deviation, 0.1 standard deviation, 0.01 standard deviation, etc.) below the optimum fuel efficiency ratio, then step 206 returns a response 'yes', followed by step 206 which concludes the method 200.

However for the preceding alternative embodiment, if the current fuel efficiency ratio is less than the specified number of standard deviations below the optimum fuel efficiency ratio, then step 206 returns a response 'no' and the method 200 continues with step 208 which comprises notifying the operator of the vehicle of ways in which to improve fuel efficiency.

Step 208 comprises notifying the operator of the vehicle of ways in which to improve fuel efficiency. Prior to notification, step 208 queries the database 104 and compares each optimum operating characteristic to the current operating characteristic in order to identify those current characteristics which may be altered to improve fuel efficiency.

Each operating characteristic (C) which is identified for being altered is determined in step 208 to deviate from its associated optimum operating characteristic ($C_{OPT}$) by more than a specified deviation measure (D), which may be a specified magnitude, percentage, number of standard deviations, etc. The deviation (D) of C from $C_{OPT}$ may be a one-sided deviation or a two-sided deviation. For example if the specified deviation measure (D) is a specified magnitude, then a two-sided deviation satisfies $|C-C_{OPT}|>D$, and a one-sided deviation satisfies $C<C-C_{OPT}$ or $C>C+C_{OPT}$ depending on the nature of the specified deviation measure (D). Similar considerations apply if the he specified deviation measure (D) is a specified percentage or number of standard deviations.

In one embodiment, the specified deviation measure (D) is variable and varies with operating characteristic, which reflects the fact that the fuel efficiency ratio is affected to a different degree by different operating characteristics.

For example, the optimum vehicle weight (e.g. unladened gross weight) may be compared to the current vehicle weight. If the current vehicle weight exceeds the optimum vehicle weight by more than the specified deviation measure, the operator will be notified that removing excess weight from the vehicle (e.g. emptying out the trunk) will improve fuel efficiency.

After identifying the current characteristics in need of alteration, step 208 notifies the operator of the vehicle of the identified current characteristics in need of alteration, by sending a message to, inter alia, a display device or an audio device located inside the vehicle. In one embodiment of the present invention, the display device will display the current characteristic and the desired characteristic.

For example, if the operator is travelling at eighty five miles per hour (85.00 mph/136.97 kph) and the optimum speed for fuel efficiency is seventy miles per hour (70.00 mph/112.65 kph), the display may state "Decreasing your speed to 70.00 mph/112.651 kph will improve your fuel efficiency". Additionally, if the vehicle's tire pressure is below the optimum pressure by more than the specified deviation measure, the notification may state "Inflate the vehicle tires to improve fuel efficiency".

Alternatively, the notification pursuant to step 208 may be made in the form of a color chart correlating to the speed at which the vehicle is travelling. Again, if the operator is travelling at eighty five miles per hour (85.00 mph/136.97 kph) and the optimum speed for fuel efficiency is seventy miles per hour (70.00 mph/112.65 kph), the display may show the color 'red' which signifies that the current rate of travel is not fuel efficient. When the operator slows down the vehicle to a speed closer to seventy miles per hour (70.00 mph/112.65 kph), the display may change from 'red' to 'orange' and possibly 'green' signifying the current speed of seventy miles per hour (70.00 mph/112.65 kph) is optimum for fuel efficiency.

After completion of step 208, the method 200 returns to step 204 to identify the current operating characteristics in light of the notification to the operator.

Figure 3:
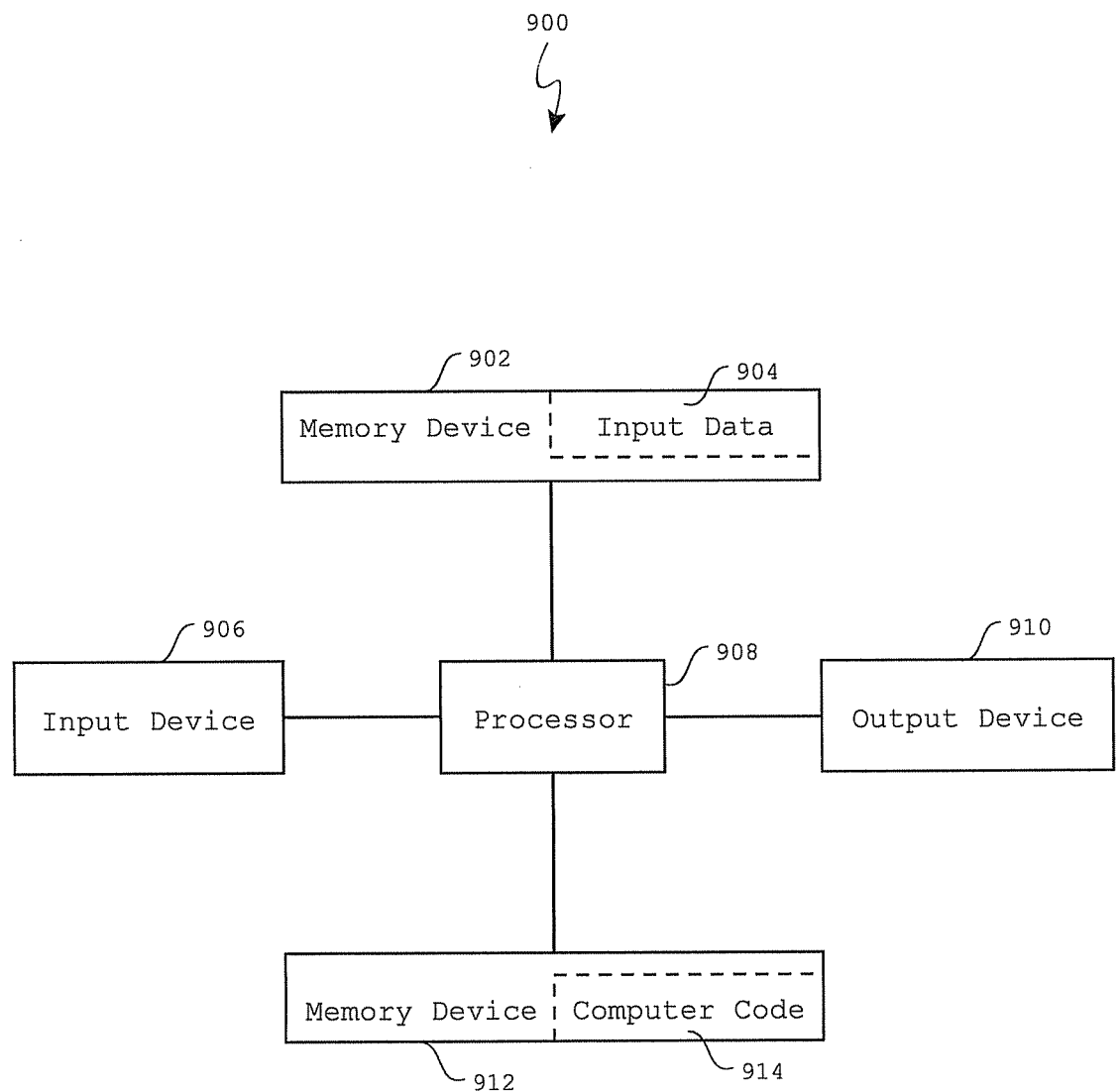
FIG. 3 illustrates a computer system which may facilitate the method for monitoring and reporting to an operator anthropogenic greenhouse gas emission, in accordance with embodiments of the present invention.

FIG. 3 illustrates a computer system 900 which may facilitate the method 100 for monitoring and reporting to an operator anthropogenic greenhouse gas emission, in accordance with embodiments of the present invention. The computer system 900 may reside in the vehicle being monitored for anthropogenic greenhouse gas emission.

The computer system 900 comprises a processor 908, an input device 906 coupled to the processor 908, an output device 910 coupled to the processor 908, and memory devices 902 and 912 each coupled to the processor 908.

The input device 906 may be, inter alia, a keyboard, a mouse, a keypad, a touch screen, a voice recognition device, a sensor, a network interface card (NIC), a Voice/video over Internet Protocol (VOIP) adapter, a wireless adapter, a telephone adapter, a dedicated circuit adapter, etc.

The output device 910 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc.

The memory devices 902 and 912 may be, inter alia, a cache, a dynamic random access memory (DRAM), a read-only memory (ROM), a hard disk, a floppy disk, a magnetic tape, an optical storage such as a compact disc (CD) or a digital video disc (DVD), etc. The memory device 912 includes a computer code 914 which is a computer program that comprises computer-executable instructions.

The computer code 914 includes, inter alia, an algorithm used for monitoring and reporting to an operator anthropogenic greenhouse gas emission according to the present invention. The processor 908 executes the computer code 914. The memory device 902 includes input data 904. The input data 904 includes input required by the computer code 914. The output device 910 displays output from the computer code 914. Either or both memory devices 902 and 912 (or one or more additional memory devices not shown in FIG. 3) may be used as a computer usable medium (or a computer readable medium or a program storage device) having a computer readable program embodied therein and/or having other data stored therein, wherein the computer readable program comprises the computer code 914. Generally, a computer program product (or, alternatively, an article of manufacture) of the computer system 900 may comprise said computer usable medium (or said program storage device).

Any of the components of the present invention can be deployed, managed, serviced, etc. by a service provider that offers to deploy or integrate computing infrastructure with respect to a process for monitoring and reporting to an operator anthropogenic greenhouse gas emission. Thus, the present invention discloses a process for supporting computer infrastructure, comprising integrating, hosting, maintaining and deploying computer-readable code into a computing system (e.g., computing system 900), wherein the code in combination with the computing system is capable of performing the method for monitoring and reporting to an operator anthropogenic greenhouse gas emission.

In another embodiment, the invention provides a business method that performs the process steps of the invention on a subscription, advertising and/or fee basis. That is, a service provider, such as a Solution Integrator, can offer to create, maintain, support, etc. a process for monitoring and reporting to an operator anthropogenic greenhouse gas emission. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 3 shows the computer system 900 as a particular configuration of hardware and software, any configuration of hardware and software, as would be known to a person of ordinary skill in the art, may be utilized for the purposes stated supra in conjunction with the particular computer system 900 of FIG. 3. For example, the memory devices 902 and 912 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for monitoring greenhouse gas emission from a vehicle, said method comprising:
 a processor of a computer system monitoring the vehicle for greenhouse gas emission, said monitoring comprising identifying a running total of greenhouse gas emitted by the vehicle into an external environment that is external to the vehicle;
 said processor detecting satisfaction of a payment triggering condition that triggers collection of a required payment pertaining to the stored running total of greenhouse gas emitted, wherein the detected payment triggering condition comprises a payment system detection condition or an excess emission condition, wherein the payment system detection condition is a detection of a payment system configured to collect the required payment, and wherein the excess emission condition is that the stored running total of greenhouse gas emitted exceeds a specified gas measure threshold;
 responsive to said detecting satisfaction of the payment triggering condition, said processor computing the required payment as a function of the stored running total of greenhouse gas emitted that exceeds the specified gas emission measure threshold; and
 said processor of a computer system providing notice of the required payment to a party selected from the group consisting of an operator of the vehicle, an owner of the vehicle, a collecting party authorized to collect the required payment, a responsible party responsible for submitting the required payment to the collecting party, and combinations thereof.

2. The method of claim 1,
 wherein the method comprises: prior to said monitoring, said processor receiving a specification of at least one greenhouse gas to be monitored;
 wherein said monitoring comprises selectively monitoring the vehicle for greenhouse gas emission of the specified at least one greenhouse gas; and
 wherein said identifying comprises identifying the running total of the quantity of the specified at least one greenhouse gas emitted by the vehicle into the external environment.

3. The method of claim 1, wherein the running total denotes a quantity of greenhouse gas emitted by the vehicle since the vehicles was last purchased.

4. The method of claim 1, wherein the running total denotes a quantity of greenhouse gas emitted by the vehicle since the payment triggering condition had been previously detected prior to said monitoring.

5. The method of claim 1, wherein the running total denotes a quantity of greenhouse gas emitted by the vehicle over a specified period of previous time.

6. The method of claim 1, wherein the payment triggering condition comprises detection of a payment system in a fuel station by a detection sensor in the vehicle after the vehicle has entered the fuel station.

7. The method of claim 1, wherein the payment triggering condition comprises a monetary removal cost of removing a quantity of greenhouse gas from the atmosphere exceeding a specified monetary removal cost threshold, and wherein the quantity of greenhouse gas is equal to the stored running total of greenhouse gas emitted.

8. The method of claim 7, wherein said computing the required payment comprises computing the required payment as a function of the monetary removal cost.

9. A computer program product comprising a computer readable physically tangible storage medium having a computer-readable program code stored therein, said computer-readable program code containing instructions that when executed by a processing unit of a computing system implement the method of claim 1, wherein the computing system comprises the computer system, and wherein the processing unit is the processor.

10. A computing system, comprising a processing unit coupled to a computer-readable physically tangible memory unit, said memory unit comprising a software application, said software application comprising instructions that when executed by the processing unit, implement the method of claim 1, wherein the computing system comprises the computer system, and wherein the processing unit is the processor.

11. A process for supporting computer infrastructure, said process comprising providing at least one support service for at least one of creating, integrating, hosting, maintaining, and deploying computer-readable code in a computing system, wherein the code in combination with the computing system is configured to perform a method for monitoring greenhouse gas emission from a vehicle, said method comprising:
 a processor of the computing system monitoring the vehicle for greenhouse gas emission, said monitoring comprising identifying a running total of greenhouse gas emitted by the vehicle into an external environment that is external to the vehicle;
 said processor detecting satisfaction of a payment triggering condition that triggers collection of a required payment pertaining to the identified running total of greenhouse gas emitted, wherein the detected payment triggering condition comprises a payment system detection condition or an excess emission condition, wherein the payment system detection condition is a detection of a payment system configured to collect the required payment, and wherein the excess emission condition is that the stored running total of greenhouse gas emitted exceeds a specified gas measure threshold;

responsive to said detecting satisfaction of the payment triggering condition, said processor computing the required payment as a function of the stored running total of greenhouse gas emitted that exceeds the specified gas emission measure threshold; and said processor providing notice of the required payment to a party selected from the group consisting of an operator of the vehicle, an owner of the vehicle, a collecting party authorized to collect the required payment, a responsible party responsible for submitting the required payment to the collecting party, and combinations thereof.

12. The process of claim 11,
wherein the method comprises: prior to said monitoring, said processor receiving a specification of at least one greenhouse gas to be monitored;
wherein said monitoring comprises selectively monitoring the vehicle for greenhouse gas emission of the specified at least one greenhouse gas; and
wherein said identifying comprises identifying the running total of the quantity of the specified at least one greenhouse gas emitted by the vehicle into the external environment.

13. The process of claim 11, wherein the running total denotes a quantity of greenhouse gas emitted by the vehicle since the vehicles was last purchased.

14. The process of claim 11, wherein the running total denotes a quantity of greenhouse gas emitted by the vehicle since the payment triggering condition had been previously detected prior to said monitoring.

15. The process of claim 11, wherein the running total denotes a quantity of greenhouse gas emitted by the vehicle over a specified period of previous time.

16. The process of claim 11, wherein the payment triggering condition comprises detection of a payment system in a fuel station by a detection sensor in the vehicle after the vehicle has entered the fuel station.

17. The process of claim 11, wherein the payment triggering condition comprises the stored running total exceeding a specified gas emission measure threshold.

18. The process of claim 11, wherein the payment triggering condition comprises a monetary removal cost of removing a quantity of greenhouse gas from the atmosphere exceeding a specified monetary removal cost threshold, and wherein the quantity of greenhouse gas is equal to the stored running total of greenhouse gas emitted.

19. The process of claim 18, wherein said computing the required payment comprises computing the required payment as a function of the monetary removal cost.

* * * * *